United States Patent Office 3,143,085
Patented Aug. 4, 1964

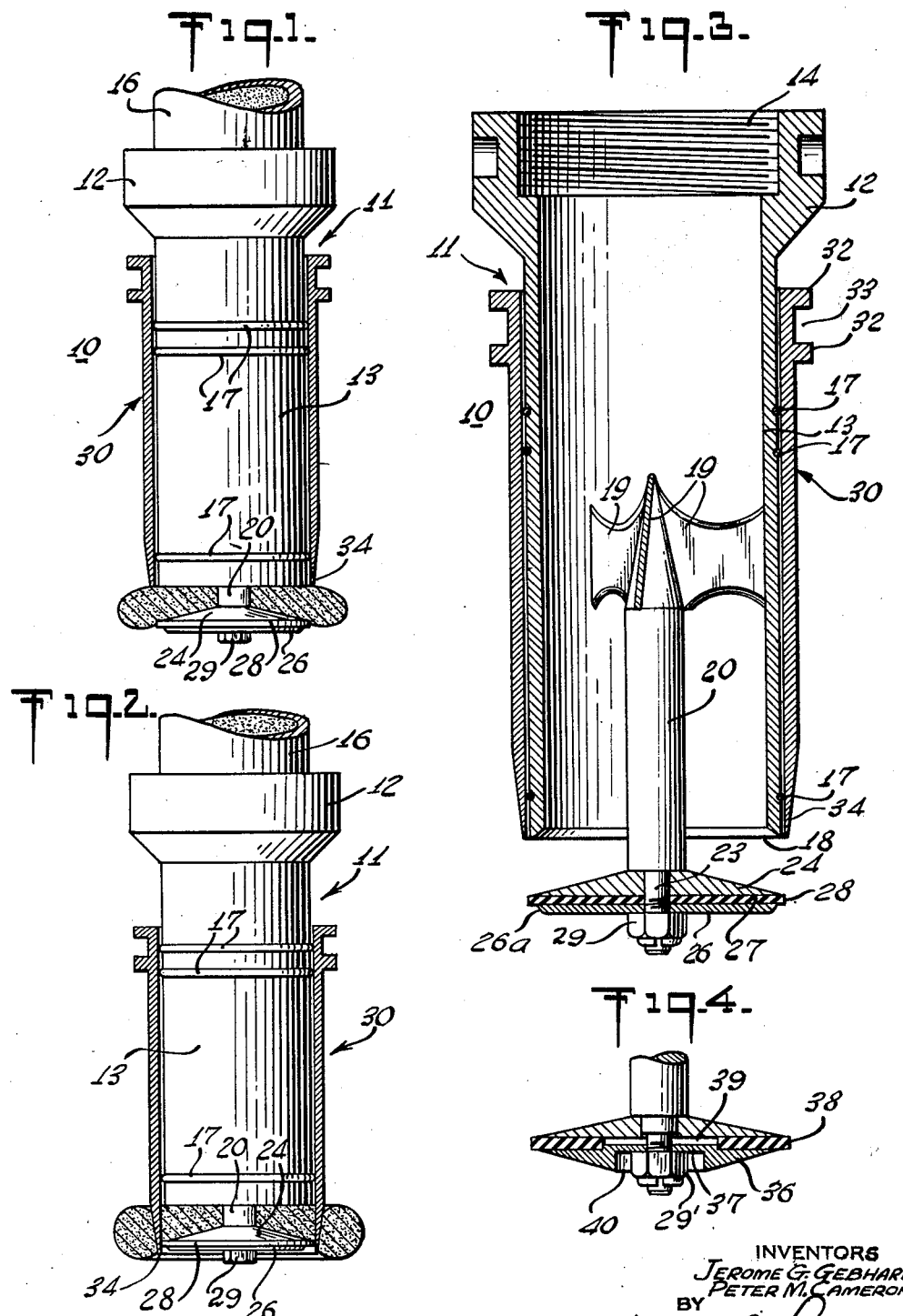

3,143,085
ADJUSTABLE CUTTER DISC
Jerome G. Gebhardt, Catonsville, and Peter M. Cameron, Owings Mills, Md., assignors to DCA Food Industries Inc., New York, N.Y., a corporation of New York
Filed Oct. 12, 1960, Ser. No. 62,243
4 Claims. (Cl. 107—14)

The present invention relates generally to improvements in comestible forming equipment, and in particular it relates to an improved doughnut forming device.

In accordance with a conventional method of forming doughnuts, the dough is stored in a closed hopper having a depending tubular discharge nozzle. The dough is then moved down and through the nozzle by compressed air in the hopper overlying the dough. A steel disc is supported below and in alignment with the nozzle, and a sleeve is reciprocated along the nozzle between positions above and into registry with or slightly below the disc to define a valve which, when open, permits the annular extrusion of the dough and when closed effects the severing of a ring-shaped piece of dough which thereupon drops from the sleeve and is directed as desired onto a tray or other support, or into a frying chamber or the like.

While the above type of doughnut cutter operates satisfactorily, the conventional mechanical construction thereof possesses many drawbacks and disadvantages. The machining tolerances which are required are very close, thereby greatly increasing the cost of the arrangement. Not only is a tight sliding fit between the nozzle and cutter sleeve required, but a perfect sliding fit between the cutter sleeve and disc is also necessary. However, the cutting of the doughnuts entails considerable wear on the cutter sleeve and disc which is reflected in the unsatisfactory shaping and cutting of the doughnuts, the formation of dough strings, clumps and other malfunctionings. As a consequence, the disc requires frequent replacement, as does the cutter sleeve. This necessitates long and frequent shut-down of the equipment and the use of expensive replacement parts. In addition to the above, other drawbacks attendant the use of the conventional doughnut cutting device leave much to be desired.

It is, therefore, a principal object of the present invention to provide an improved device for forming and cutting doughnuts.

Another object of the present invention is to provide an improved automatic doughnut cutting device in which component wear is minimized and the replacement of parts greatly expedited.

A further object of the present invention is to provide an improved automatic doughnut cutter which may be easily adjusted to compensate for component wear.

Still a further object of the present invention is to provide an improved doughnut cutter of the above nature characterized by its simplicity of structure and assembly, ruggedness and low cost.

The above and other objects of the present invention will become apparent from a reading of the following description, taken in conjunction with the accompanying drawing, wherein FIGURE 1 is a front elevational view, partially in section, of a doughnut cutting device embodying the present invention, the device being illustrated in the dough extruding position and at the commenceemnt of the cutting or shearing step;

FIGURE 2 is a view similar to FIGURE 1, the parts being illustrated in position immediately following the completion of the cutting of the doughnut;

FIGURE 3 is an enlarged detail longitudinal sectional view of the cutting device in retracted position; and FIGURE 4 is a longitudinal sectional view of a modified form of cutting disc constructed according to and embodying the invention hereof.

In a sense, the present invention contemplates the provision of an improved cutting device of the character described comprising a tubular nozzle, a support stem depending below said nozzle, a pair of coaxial discs mounted on said stem below said nozzle, an annulus of elastomeric material sandwiched between the confronting faces of said discs and projecting beyond the peripheries thereof, means for axially adjusting the relative positions of said discs whereby to compress and radially expand said annulus, and a cutter sleeve slidably registering with said nozzle and reciprocable between an advanced depressed position registering with said annulus and a retracted position above said annulus, the inner diameter of said cutter sleeve being greater than the outer diameter of said discs.

According to a preferred form of the present invention, the support stem is coaxial with the nozzle and is provided at its depending end with an integral threaded shank of smaller cross-section than the stem. The discs have confronting flat faces and central openings which register with the threaded shank. The axial spacing of the discs is adjusted by means of a nut engaging the shank beneath the lowermost disc. The diameter of the discs is between .040 and .025 inch less than the inner diameter of the nozzle and the annulus has a durometer reading of between 70 and 90. A plurality of longitudinally spaced O-rings register with corresponding peripheral grooves formed in the nozzle outer face, the cutter sleeve being of greater diameter than the nozzle and riding along the O-rings.

Referring now to the drawing and more particularly to FIGURES 1 to 3 thereof, which illustrate one form of device constructed according to and embodying the present invention, reference numeral 10 generally designates the improved device as adapted to the cutting of doughnuts, the said cutting device 10 including a nozzle 11 consisting of an upper coupling section 12 and a depending vertical tubular section 13. The upper section 12 of the nozzle is of relatively heavy cross-section and is provided with a threaded inner face 14 which tightly engages the correspondingly threaded lower end of a dough feed pipe 16. Dough feed pipe 16 communicates with the bottom of a hopper (not shown), in the well known manner, which contains dough under pressure either effected by compressed air, a weighted follower, or similar conventional means. The outer surface of tubular nozzle section 13 has a plurality of longitudinally spaced peripheral grooves formed therein, each of the grooves having registering therewith an O-ring 17, preferably formed of elastomeric material, such as natural or synthetic rubber. The bottom of the tubular member 17 is beveled along its inner edge as indicated at 18.

Located within tubular section 13, about one-third the length above the bottom thereof, is a spider 19 having radiating arms, the termini of which are affixed to the wall of the tubular section 13 in any suitable manner. A cylindrical stem or rod 20 is coaxial with the nozzle 11 and depends from spider 19, said spider being formed integrally with said stem, so that a unitary arrangement is provided consisting of the spider 19 and the said stem 20. The stem 20 extends below the lower edge of tubular member 13 and terminates in a depending threaded axial shank 23 of reduced cross-section.

Mounted on stem shank 23 are a pair of upper and lower discs identified at 24 and 26 respectively, which discs are provided with central openings registering with the shank 23. Upper disc 24 has a flat underface and a conical upper surface terminating in a horizontal section abutting the underface of the stem 20. The lower disc 26 is provided with top and bottom flat faces and has an upwardly outwardly beveled outer edge, as indicated at 26a. The peripheries of discs 24 and 26 are in vertical alignment.

Registering with shank 23 and sandwiched between the flat confronting faces of discs 24 and 26 is an annulus 27, having a peripheral border 28 projecting beyond the peripheral edges of discs 24 and 26. As seen in the drawings, the peripheral border of annulus 27 is of substantially uniform thickness to the peripheral edge thereof. Annulus 27 is formed of an elastomeric material having a durometer reading of between 70 and 90. It has been found that maximum efficiency in operation of the subject cutter is achieved when the durometer reading of the annulus is as aforesaid. A nut 29 preferably of the self-locking type, for example an elastic stop nut, engages the shank 23 below the disc 26 and a lock washer, as desired. By tightening nut 29, the axial separation of discs 24 and 26 is adjusted thereby controlling the coaxial compression of the annulus 27 and the radial expansion thereof. The greater the compression of annulus 27 between discs 24 and 26, the greater the diameter thereof, and vice versa. Axial compression of annulus 27 is accompanied by radial expansion thereof, and release of said compression is accompanied by the radial contraction of the annulus 27.

A cutter sleeve 30 slidably registers with tube nozzle section 13, and is provided at its upper border with a pair of longitudinally spaced peripheral flanges 32 delineating between them a peripheral channel 33. Cutter sleeve 30 terminates at its lower end in a cutting edge formed by the inward downward taper of the outer face of sleeve 30 to the bottom edge thereof. It is important to note that the inner diameter of cutter sleeve 30, and particularly at its lower border, exceeds the diameter of discs 24 and 26 by between .025" and .040", for example by 1/32". In addition, the inner diameter of the cutter sleeve 30 is slightly greater than the outer diameter of the nozzle tubular section 13 and snugly slidably engages the O-rings 17. The cutter sleeve is reciprocated in the conventional manner between the positions illustrated in FIGURES 1 and 2 of the drawing.

In adjusting the cutter described above, nut 29 is loosened and cutter sleeve 30 depressed into position registering with discs 24 and 26 and annulus 27. Nut 29 is then tightened until a free sliding frictional engagement is effected between annulus 27 and the inner face of cutter sleeve 30. The cutter is now in condition for use. The hopper is filled with dough and pressure applied to urge the dough through nozzle 11. As sleeve 30 is raised to the position illustrated in FIGURE 1 wherein the space between nozzle bottom 18 and the discs is unobstructed, dough is annularly extruded and upon depression of the sleeve to its advanced position as illustrated in FIGURE 2, the flow of dough is stopped and a circular ring-shaped doughnut of substantially circular transverse section is formed, which thereupon drops from cutter 10.

In the event that the doughnut cutting operation deteriorates by reason of the wearing of annulus 27, nut 29 is merely further tightened in the manner above set forth. Should the annulus be so worn as to expand no further in compression, it may be replaced simply, easily and quickly by removing nut 29 and disc 26. If it is found that the fit of the sleeve 30 on nozzle 11 has become sloppy, this may be remedied by removing sleeve 30 and replacing O-rings 17. It is apparent that the above operations are simple and rapid and require a minimum of shut-down time and may be readily performed in the field.

In FIGURE 4 of the drawing, there is illustrated another form of disc and annulus arrangement differing from that previously described primarily in that in place of the flat faced disc 26, there is provided a bottom disc 36 having formed in its upper face a centrally located low cylindrical boss 37. Annulus 38 has an enlarged opening 39 formed therein registering with boss 37. The underface of disc 36 is conically shaped and is provided with a central well 40 which accommodates the nut 29'. In operation and other respects, the above arrangement is similar to that first described.

While there have been described and illustrated preferred embodiments of the present invention, it is apparent that numerous alterations and omissions may be made without departing from the spirit thereof.

We claim:

1. A doughnut forming device comprising a tubular nozzle, a support stem depending below said nozzle, a pair of coaxial discs mounted on said stem below said nozzle, an annulus of elastomeric material sandwiched between the peripheries thereof and having a peripheral border of substantially uniform thickness extending to the peripheral edge of said annulus, means for axially adjusting the relative positions of said discs whereby to selectively compress and radially expand said annulus and release and radially contract said annulus, and a cutter sleeve having a lower section provided with a downwardly directed sharp cutting edge and slidably registering with said nozzle and reciprocable between an advanced depressed position slidably engaging the periphery of said annulus and a retracted position above said annulus, the inner diameter of said cutter sleeve being greater than the outer diameter of said discs and the periphery of said annulus being normally expanded into a slidable substantially frictional engagement with the inner periphery of said cutter sleeve lower section when said cutter sleeve is in said depressed position.

2. The device of claim 1, wherein said elastomeric annulus has a durometer reading of between 70 and 90.

3. The device of claim 1, wherein one of said discs has a raised cylindrical projection centrally located on the inner face thereof, and said annulus has a central opening formed therein registering with said projection.

4. A doughnut forming device comprising a tubular nozzle, a support stem depending below said nozzle, a pair of coaxial discs mounted on said stem below said nozzle, an annulus of elastomeric material sandwiched between the peripheries thereof and having a peripheral border of substantially uniform thickness extending to the peripheral edge of said annulus, means for axially adjusting the relative positions of said discs whereby to selectively compress and radially expand said annulus and release and radially contract said annulus, and a cutter sleeve having a downwardly directed sharp cutting edge and slidably registering with said nozzle and reciprocable between an advanced depressed position registering with said annulus and a retracted position above said annulus, the inner diameter of said cutter sleeve exceeding the outer diameter of said discs by between approximately .040" and .025".

References Cited in the file of this patent

UNITED STATES PATENTS

| | | |
|---|---|---|
| 1,754,764 | Olson | Apr. 15, 1930 |
| 2,023,560 | Wayner | Dec. 10, 1935 |
| 2,117,399 | Carpenter | May 17, 1938 |
| 2,405,903 | Premas | Aug. 13, 1946 |
| 2,811,397 | Cline | Oct. 29, 1957 |
| 2,882,838 | Gilmore | Apr. 21, 1959 |
| 2,953,154 | Agoliati et al. | Sept. 20, 1960 |
| 2,962,810 | Gilmore | Dec. 6, 1960 |